United States Patent
Choi

(10) Patent No.: US 10,205,376 B2
(45) Date of Patent: Feb. 12, 2019

(54) SWITCH CONTROL CIRCUIT INCLUDING MULTIPIN TO SET DEAD TIME INFORMATION AND/OR PROTECTION MODE

(71) Applicant: FAIRCHILD KOREA SEMICONDUCTOR LTD., Bucheon-si (KR)

(72) Inventor: Hang-Seok Choi, Bedford, NH (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/446,513

(22) Filed: Mar. 1, 2017

(65) Prior Publication Data

US 2017/0179809 A1 Jun. 22, 2017

Related U.S. Application Data

(63) Continuation of application No. 14/272,580, filed on May 8, 2014.

(51) Int. Cl.
| | |
|---|---|
| *H02M 3/335* | (2006.01) |
| *H02M 1/08* | (2006.01) |
| *H02M 1/088* | (2006.01) |
| *H02M 1/32* | (2007.01) |
| *H02M 1/36* | (2007.01) |
| *H02M 1/38* | (2007.01) |
| *H02M 1/00* | (2006.01) |

(52) U.S. Cl.
CPC .......... *H02M 1/08* (2013.01); *H02M 1/088* (2013.01); *H02M 1/32* (2013.01); *H02M 1/36* (2013.01); *H02M 1/38* (2013.01); *H02M 3/33592* (2013.01); *H02M 2001/0058* (2013.01); *Y02B 70/1475* (2013.01); *Y02B 70/1491* (2013.01)

(58) Field of Classification Search
None
See application file for complete search history.

(56) References Cited

U.S. PATENT DOCUMENTS

| | | |
|---|---|---|
| 5,872,709 A | 2/1999 | Huang |
| 7,911,812 B2 * | 3/2011 | Colbeck .............. H02M 1/4225 363/21.02 |

(Continued)

OTHER PUBLICATIONS

Fairchild Semiconductor Corporation, "FAN7631 Advanced Pulse Frequency Modulation (PFM) Controller for Half-Bridge Resonant Converters," www.fairchildsemi.com, Apr. 2012, 19 pages.

*Primary Examiner* — Jeffrey A Gblende
(74) *Attorney, Agent, or Firm* — AMPACC Law Group, PLLC

(57) ABSTRACT

A switch control circuit includes a first pin connected to a first voltage, and a second pin connected to another end of a first resistor including an end connected to the first pin and a first capacitor. In the switch control circuit, at least two of first dead time information, second dead time information, and a protection mode are set by using a multi-voltage of the second pin. The first dead time information is information about a dead time of a first switch and a second switch controlling power supply, the second dead time information is information about a dead time for synchronous rectification, and the protection mode includes an auto-restart mode and a latch mode.

14 Claims, 4 Drawing Sheets

(56) References Cited

U.S. PATENT DOCUMENTS

| | | | |
|---|---|---|---|
| 2001/0036085 A1* | 11/2001 | Narita | H02M 3/1588 |
| | | | 363/16 |
| 2009/0196074 A1* | 8/2009 | Choi | H02M 3/337 |
| | | | 363/21.02 |
| 2009/0251929 A1* | 10/2009 | Choi | H02M 1/08 |
| | | | 363/21.02 |
| 2010/0002474 A1 | 1/2010 | Moon et al. | |
| 2010/0308655 A1 | 12/2010 | Wachi et al. | |
| 2011/0103097 A1* | 5/2011 | Wang | H02M 3/33592 |
| | | | 363/17 |
| 2011/0305047 A1 | 12/2011 | Jungreis et al. | |
| 2014/0320007 A1 | 10/2014 | Stamm et al. | |

* cited by examiner

SWITCH CONTROL CIRCUIT INCLUDING MULTIPIN TO SET DEAD TIME INFORMATION AND/OR PROTECTION MODE

CROSS-REFERENCE TO RELATED APPLICATIONS

This application is a continuation of U.S. patent application Ser. No. 14/272,580 filed May 8, 2014. The entire disclosure of which is incorporated herein by reference.

BACKGROUND (a) Field

Embodiments relates to a switch control circuit and a power supply device including the same.

(b) Description of the Related Art

A general controller includes pins corresponding to required functions. For example, a pin for setting a dead time, a pin for setting a protection mode, and a pin for remote controlling are provided in the controller.

When the number of required functions is increased, the number of pins is increased, and thus a size of a control IC is increased and a production cost is increased.

SUMMARY

Embodiments have been made in an effort to provide a switch control circuit and a power supply device minimizing an increase in number of pins and size of a control IC through embodiments.

An embodiment provides a switch control circuit comprising: a first pin configured to be connected to a first voltage, and a second pin configured to be connected to another end of a first resistor including an end connected to the first pin and a first capacitor, wherein at least two of first dead time information, second dead time information, and a protection mode are set by using a multi-voltage of the second pin. The first dead time information may be information about a dead time of a first switch and a second switch controlling power supply, the second dead time information may be information about a dead time for synchronous rectification, and the protection mode may include an auto-restart mode and a latch mode.

When the multi-voltage starts to occur and reaches an initialization voltage, the switch control circuit is initialized and performs at least one of setting of a first dead time and setting of a second dead time during an initialization period.

After the initialization period is ended, a protection mode is set according to a level of the multi-voltage when the multi-voltage is in a steady state.

The first switch is connected to the second pin and performs a switching operation by a remote control signal.

A multi-voltage occurs when the first switch is turned-off, and the multi-voltage is pulled-down when the first switch is turned-on.

The switch control circuit further comprises a biasing circuit configured to supply the first voltage to the first pin when a source voltage supplied to the switch control circuit is in a steady state.

The switch control circuit further comprises an initialization unit configured to count an initialization period by using a count clock signal from a time at which the multi-voltage reaches an initialization voltage.

The initialization unit includes a first counter configured to be enabled at a time at which the multi-voltage reaches the initialization voltage and including a plurality of output ends having a level determined according to a count result using the count clock signal, and the initialization unit determines an end of the initialization period according to an output of the output end corresponding to the initialization period among the plurality of output ends.

A first period during which the multi-voltage is changed from a first threshold voltage to a second threshold voltage is counted to set the first dead time.

The switch control circuit further comprises a first comparator configured to generate a first comparison signal according to a comparison result of the multi-voltage and the first threshold voltage, a second comparator configured to generate a second comparison signal according to a comparison result of the multi-voltage and the second threshold voltage, and a second counter configured to be enabled based on the first comparison signal and reset based on the second comparison signal to count the first period.

The switch control circuit further comprises a first D-flip-flop configured to be reset by an inverted comparison signal obtained by reversing the first comparison signal, a second D-flip-flop configured to be synchronized with an inverted output signal of the first D-flip-flop to output an output signal of an enable level, and reset by the second comparison signal, and a first logic gate configured to perform a logical operation of the output signal and the first comparison signal of the second D-flip-flop to generate a first count enable signal.

The second counter is synchronized with a rising edge of the first count enable signal to be enabled and reset after a first delay period from a falling edge time of the first count enable signal.

The switch control circuit further comprises a second logic gate configured to perform a logical operation of an inverted first count enable signal and a signal obtained by delaying the first count enable signal by a second delay period to generate a first register read signal.

The switch control circuit further comprises a first register configured to include a plurality of input ends connected to a plurality of output ends of a second counter and be synchronized with the first register read signal to store inputs of the plurality of input ends. The plurality of output ends of the second counter have a level according to a count result.

A second period during which the multi-voltage is changed from a second threshold voltage to a first threshold voltage is counted to set a second dead time. The switch control circuit further comprises a first comparator configured to generate a first comparison signal according to a comparison result of the multi-voltage and the first threshold voltage, a third D-flip-flop configured to generate a second count enable signal at a high level at a first time delayed from a time at which the multi-voltage reaches the second threshold voltage by a first delay period, and be reset by an inverted comparison signal obtained by inverting the first comparison signal, and a second counter configured to be reset at the first time, and synchronized with a rising edge of the second count enable signal to count the second period.

The switch control circuit further comprises a third logic gate configured to perform a logical operation of an inverted second count enable signal and a signal obtained by delaying the second count enable signal by a second delay period to generate a second register read signal.

The switch control circuit further comprises a second register configured to include a plurality of input ends connected to a plurality of output ends of the second counter and be synchronized with the second register read signal to store inputs of the plurality of input ends. The plurality of output ends of the second counter have a level according to a count result.

The switch control circuit further comprises a sink current source configured to be connected to a second pin, and a second switch configured to be connected between the sink current source and a ground. The second switch is synchronized to be turned-on at a time at which the multi-voltage reaches the second threshold voltage, and synchronized to be turned-off at a time at which the multi-voltage reaches the first threshold voltage.

The switch control circuit further comprises a sink current source configured to be connected to the second pin, and the second switch configured to be connected between the sink current source and a ground. The second switch is turned-on at a time at which the multi-voltage reaches an initialization voltage, and turned-off at a time at which the multi-voltage reaches a first threshold voltage. The initialization voltage is a voltage controlling an initialization start of the switch control circuit, and the first threshold voltage is a voltage controlling the first dead time information and the second dead time information.

A diode may be connected between the first pin and the end of the first resistor. Another embodiment provides A power supply device comprising: a first switch and a second switch configured to be connected in series between an input voltage and a primary side ground, a transformer configured to include a primary side wire connected between the input voltage and a node connected to the first switch and the second switch and a secondary side wire, a first synchronous rectification switch configured to rectify a current flowing through a first wire of a secondary side, a second synchronous rectification switch configured to rectify a current flowing through a second wire of the secondary side, a switch control circuit configured to include a first pin connected to a first voltage and a second pin, and set at least two of first dead time information, second dead time information, and a protection mode by using a multi-voltage of the second pin, a first resistor configured to be connected between the first pin and the second pin, and a first capacitor configured to be connected to the second pin.

The first dead time information may be information about a dead time of the first switch and the second switch, the second dead time information may be information about a dead time of the first synchronous rectification switch and the second synchronous rectification switch, and the protection mode includes an auto-restart mode and a latch mode.

The power supply device further comprises the first switch configured to be connected to the second pin. The first switch performs a switching operation by a remote control signal.

The power supply device further comprises a sink current source configured to be connected to the second pin, and the second switch configured to be connected between the sink current source and the ground.

The switch control circuit sets a first dead time by counting a first period during which the multi-voltage is changed from a first threshold voltage to a second threshold voltage.

The switch control circuit sets a second dead time by counting a second period during which the multi-voltage is changed from a second threshold voltage to a first threshold voltage.

The power supply device further may comprise a diode configured to be connected between the first pin and the first resistor.

According to the embodiments, there are provided a switch control circuit minimizing an increase in number of pins and size of a control IC, and a power supply device including the same.

DETAILED DESCRIPTION OF THE EMBODIMENTS

Figure 1:
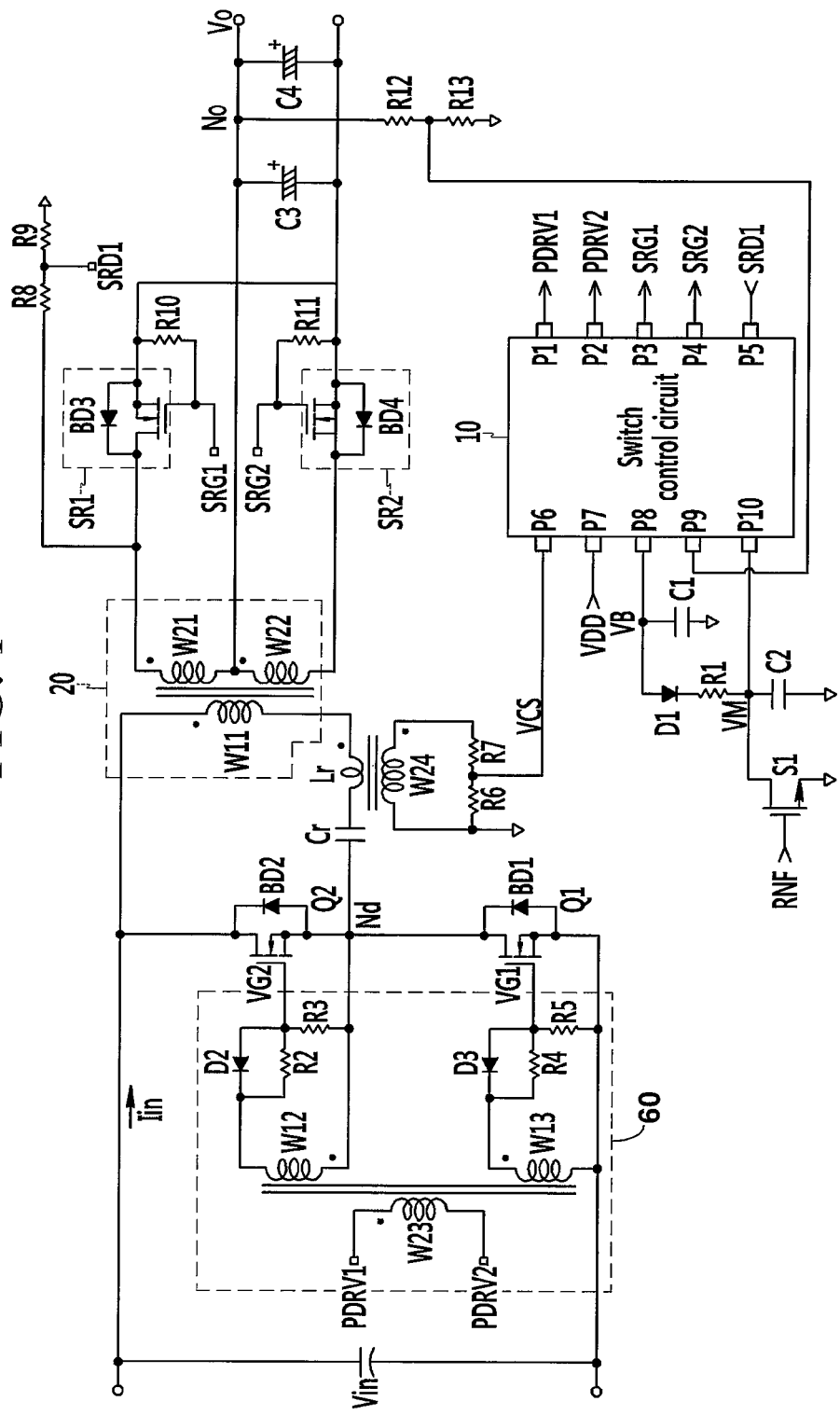
FIG. 1 is a view showing a power supply device according to an embodiment.

Hereinafter, the embodiments will be described in detail with reference to the accompanying drawings so that those skilled in the art may easily practice the embodiment. As those skilled in the art would realize, the described embodiments may be modified in various different ways, all without departing from the spirit or scope of the invention. The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

A multifunctional pin of a switch controller according to an embodiment is connected to electric elements so that at least two control information are set. For example, a resistor, a capacitor, and a switching element may be electrically connected to the multifunctional pin. Control information may be set through a voltage of the multifunctional pin. Additionally, a diode may be connected between the capacitor and the resistor.

Control information is information required to control a switching operation, and may include at least two of remote control information, information for setting a protection mode, information about a dead time between primary side switches, and information about a dead time for secondary synchronous rectification. Secondary synchronous rectification is performed through a first synchronous rectification switch and a second synchronous rectification switch connected to a secondary wire. Remote control information may be control information shutting down or activating a power supply device.

FIG. 1 is a view showing a power supply device according to an embodiment.

The power supply device shown in FIG. 1 is embodied by a half-bridge LLC resonance type converter (hereinafter, converter), but a converter type to which the embodiment is capable of being applied is not limited thereto. The half-bridge LLC resonance type converter will be described as an example to describe setting of control information.

A power supply device 1 includes a first switch Q1, a second switch Q2, a transformer 20, a gate driving circuit 60, a first synchronous rectification switch SR1, a second synchronous rectification switch SR2, and a switch control circuit 10.

Body diodes BD1 and BD2 are formed between a drain and a source of the first switch Q1 and between the drain and the source of the second switch Q2, respectively.

The second switch Q2 and the first switch Q1 are connected in series between an input voltage Vin and a primary side ground, and the second switch Q2 and the first switch Q1 alternately perform the switching operation. The second switch Q2 is turned-off, the first switch Q1 is turned-on after a first dead time, the first switch Q1 is turned-off, and the second switch Q2 is turned-on after the first dead time.

The drain of the second switch Q2 is connected to the input voltage Vin, the source of the second switch Q2 and the drain of the first switch Q1 are connected in a node Nd, and the source of the first switch Q1 is connected to the primary side ground. Gate voltages VG1 and VG2 are supplied to gates of the second switch Q2 and the first switch Q1. The first switch Q1 and the second switch Q2 are alternately switched, and power supply is controlled according to the switching operation. For example, power supply is increased as switching frequencies of the first switch Q1 and the second switch Q2 are reduced. Power supply is reduced as a switching frequency is increased.

A capacitor Cr, a primary side wire W11 of a transformer 20, and an inductor Lr are connected in series between the input voltage Vin and the node Nd. A resonance occurs among the capacitor Cr, the primary side wire W11, and the inductor Lr. A current Iin inputted to a primary side is controlled by a sine wave due to the resonance.

A wire W21 and a wire W22 are insulating-coupled with the primary side wire W11 at a predetermined wiring ratio in a secondary side of the transformer 20. The first synchronous rectification switch SR1 is connected to an end of the secondary side wire W21. A body diode BD3 is formed between a drain and a source of the first synchronous current switch SR1. The second synchronous rectification switch SR2 is connected to an end of the secondary side wire W22. A body diode BD4 is formed between a drain and a source of the second synchronous rectification switch SR2.

A turn-on time of the first synchronous rectification switch SR1 (or the second synchronous rectification switch SR2) is determined according to a conduction time of the body diode BD3 (or the body diode BD4). A turn-off time of the first synchronous rectification switch SR1 (or the second synchronous rectification switch SR2) is determined based on the result obtained by counting turn-on periods during a prior switching cycle.

For example, after the body diode BD3 (or BD4) is conducted by a switching operation of the primary side, a conduction period is counted. Thereafter, when the body diode BD3 (or BD4) is conducted again, the first synchronous rectification switch SR1 (or SR2) is turned-on, and the turn-on period of the first synchronous rectification switch SR1 (or SR2) is set based on the prior conduction period of the body diode BD3 (or BD4). In this case, the turn-on period may be set to a period that is shorter than the counted prior conduction period of the body diode by a predetermined margin.

When a set turn-on period elapses, the first synchronous rectification switch SR1 is turned-off. Moreover, the conduction period of the body diode BD3 (or BD4) is counted during a current switching cycle of the first synchronous rectification switch SR1.

When the body diode BD3 (or BD4) is conducted again, the first synchronous rectification switch SR1 (or SR2) is turned-on, and the turn-on period of the first synchronous rectification switch SR1 (or SR2) is set based on the conduction period of the body diode BD3 (or BD4) during the prior switch cycle. When the set turn-on period elapses, the first synchronous rectification switch SR1 is turned-off. Moreover, the conduction period of the body diode BD3 (or BD4) is counted during the current switching cycle of the first synchronous rectification switch SR1.

The switching operation of the first synchronous rectification switch SR1 (or SR2) may be controlled by repeating the aforementioned operation.

The conduction period of the body diode BD3 (or BD4) may be seen by sensing both end voltages of the first synchronous rectification switch SR1 (or SR2). When the body diode BD3 (or BD4) is conducted, the both end voltages become low voltages that are close to a zero voltage. When the current flowing the body diode BD3 (or BD4) is reduced to 0 after resonance, the body diode BD3 blocks an inverse direction current and the both end voltages become high voltages.

Since the both end voltages of the first synchronous rectification switch SR1 and the both end voltages of the second synchronous rectification switch SR2 are symmetrical to each other, when any one both end voltage is obtained, other both end voltages are capable of being estimated. Therefore, in the embodiment, measurement of only the both end voltages of the first synchronous rectification switch SR1 will be described. In FIG. 1, a resistor R8 and a resistor R9 are connected in series between a drain of the first synchronous rectification switch SR1 and a secondary side ground. A voltage SRD1 of the node at which the two resistors are connected is supplied through a pin P5 to the switch control circuit 10. However, the embodiment is not limited thereto.

The aforementioned controlling of the first and second synchronous rectification switches SR1 and SR2 is performed by the switch control circuit 10. The switch control circuit 10 includes a pin P3, a pin P4, and the pin P5. A gate voltage SRG1 is outputted through the pin P3, a gate voltage SRG2 is outputted through the pin P4, and the voltage SRD1 is inputted through the pin P5.

The source of the first synchronous rectification switch SR1 is connected to the secondary side ground, and the drain is connected to an end of the secondary side wire W21. The gate voltage SRG1 is inputted to the gate. A resistor R10 is connected between the gate and the source of the first synchronous rectification switch SR1. The source of the second synchronous rectification switch SR2 is connected to the secondary side ground, and the drain is connected to an end of the secondary side wire W22. The gate voltage SRG2 is inputted to the gate. A resistor R11 is connected between the gate and the source of the second synchronous rectification switch SR2.

Another end of the secondary side wire W21 and another end of the wire W22 are connected to an output node No. A capacitor C3 and a capacitor C4 are connected between the output node No and the secondary side ground. A voltage of the output node No is an output voltage Vo.

The current flowing through the first synchronous rectification switch SR1 to the secondary side wire W21 is rectified and flows to the capacitors C3 and C4. The current flowing through the second synchronous rectification switch SR2 to the secondary side wire W22 is rectified and flows to the capacitors C3 and C4 to generate the output voltage Vo.

A feedback voltage VFB between two resistors R12 and R13 connected in series between the output node No and the secondary side ground is inputted through a pin P9 to the switch control circuit 10. The feedback voltage VFB is information about the output voltage Vo. The switch control circuit 10 determines the switching frequency according to increasing or decreasing of the feedback voltage VFB. For example, when the feedback voltage VFB is increased, the switching frequency is increased to reduce the current supplied to a load. When the feedback voltage VFB is decreased, the switching frequency is reduced to increase the current supplied to the load.

The switch control circuit 10 receives remote control information by using a voltage of a multifunctional pin P10 (hereinafter, multi-voltage VM). The switch control circuit 10 sets information for setting a protection mode, information about the first dead time between the second switch Q2 and the first switch Q1, and information about a second dead time between the first synchronous rectification switch SR1 and the second synchronous rectification switch SR2. A diode D1, a resistor R1, a capacitor C2, and a switch S1 are connected to the multifunctional pin P10.

The switch control circuit 10 further includes a plurality of pins in addition to the multifunctional pin P10. For example, the switch control circuit 10 may further include a pin P1 to which a first driving voltage PDRV1 is outputted, a pin P2 to which a second driving voltage PDRV2 is outputted, a pin P7 to which a source voltage VDD is supplied, a pin P8 connected to a bias voltage VB for charging the capacitor C2, and a pin P6 for sensing a primary side current. The embodiment is not limited thereto, and the switch control circuit 10 may further include a pin other than the pins shown in FIG. 1.

The gate driving circuit 60 includes a secondary side wire W23, two primary side wires W12 and W13, four resistors R2 to R5, and two diodes D2 and D3.

The first driving voltage PDRV1 is inputted to an end of the secondary side wire W23, and the second driving voltage PDRV2 is inputted to another end of the secondary side wire W23. The resistor R2 and the diode D2 are connected in parallel between an end of the primary side wire W12 and the gate of the second switch Q2. Another end of the primary side wire W12 is connected to an end of the resistor R3 and the node Nd. The resistor R2, the resistor R3, and an anode of the diode D2 are connected to the gate of the second switch Q2. The resistor R4 and the diode D3 are connected in parallel between an end of the primary side wire W13 and the gate of the first switch Q1. Another end of the primary side wire W13 is connected to an end of the resistor R5 and the primary side ground. The resistor R4, the resistor R5, and an anode of the diode D3 are connected to the gate of the first switch Q1.

The first switch Q1 performs a switching operation according to the gate voltage VG1, and the second switch Q2 performs the switching operation according to the gate voltage VG2. Since the first switch Q1 and the second switch Q2 are an n channel transistor, an enable level of each of the gate voltage VG1 and the gate voltage VG2 is a high level, and a disable level is a low level.

When the first driving voltage PDRV1 has the high level and the second driving voltage PDRV2 has the low level, the current of the primary side wire W12 flows through the resistor R3 and the diode D2, and the current of the primary side wire W13 flows through the resistor R4 and the resistor R5. Then, the gate voltage VG1 becomes a high level voltage capable of turning-on the first switch Q1, and thus the first switch Q1 is turned-on. The gate voltage VG2 becomes a voltage that is lower than the source voltage of the second switch Q2, and thus the second switch Q2 is turned-off.

When the second driving voltage PDRV2 is the high level and the first driving voltage PDRV1 is the low level, the current of the primary side wire W12 flows through the resistor R2 and the resistor R3, and the current of the primary side wire W13 flows through the resistor R5 and the diode D3. Then, the gate voltage VG2 becomes the high level voltage capable of turning-on the second switch Q2, and thus the second switch Q2 is turned-on. The gate voltage VG1 becomes a voltage that is lower than the source voltage of the first switch Q1, and thus the first switch Q1 is turned-off.

When the input current Iin flows through the inductor Lr, the current is induced to a secondary side wire W24 to generate a sensing voltage VCS. For example, when the input current Iin flows in a direction toward the node Nd due to resonance, the current of the secondary side wire W24 flows through a resistor R7 and a resistor R6 to the secondary side ground. Then, a positive sensing voltage VCS corresponding to the input current Iin occurs. When the input current Iin flows in a discharge direction from the node Nd due to resonance, the current of the secondary side wire W24 flows from the secondary side ground through the resistor R6 and the resistor R7. Then, a negative sensing voltage VCS corresponding to the input current Iin occurs.

The sensing voltage VCS may be supplied through the pin P6 to the switch control circuit 10, and the switch control circuit 10 may sense an overcurrent by using the sensing voltage VCS.

A capacitor C1 is connected to the pin P8, and a ripple of the bias voltage VB is filtered by the capacitor C1.

An anode of the diode D1 is connected to the bias voltage VB, and a cathode of the diode D1 is connected to an end of the resistor R1. Another end of the resistor R1 is connected to the pin P10. The capacitor C2 is connected between the pin P10 and the secondary side ground.

In FIG. 1, the diode D1, the resistor R1, and the capacitor C2 are connected in series, but the embodiment is not limited thereto. The resistor R1 and the capacitor C2 may be connected in series without the diode D1. Setting of the protection mode relates to whether the diode D1 is connected or not. A detailed configuration will be described below.

A drain of the switch S1 is connected to the pin P10, a source of the switch S1 is connected to the secondary side ground, and a remote control signal RNF is applied to a gate of the switch S1.

When the remote control signal RNF has an enable level, for example, a low level, the switch S1 is turned-off, and thus the capacitor C1 is charged. The multi-voltage VM is increased by charging the capacitor C1 to trigger a start-up operation. When the remote control signal RNF has a disable level, for example, a high level, the switch S1 is turned-on, and thus the multi-voltage VM is pulled-down to a zero voltage. Then, the switch control circuit 10 is not initialized, and the power supply device 1 does not start-up. Further, when the remote control signal RNF is a high level during the operation of the switch control circuit 10, the switch control circuit 10 stops the switching operation of the first switch Q1 and the second switch Q2. Then, the power supply device 1 is shut-down.

The switch control circuit 10 may count a period during which the multi-voltage VM is increased from a first threshold voltage VTH1 to a second threshold voltage VTH2, and set the counted period as the first dead time.

Further, the switch control circuit 10 may count a period during which the multi-voltage VM is decreased from the second threshold voltage VTH2 to the first threshold voltage VTH1 with a predetermined slope, and set the counted period as the second dead time.

Moreover, the switch control circuit 10 may set the protection mode according to a steady state level of the multi-voltage VM. The protection mode may be an auto-restart mode or a latch mode. The auto-restart mode is a protection mode where an operation of the switch control circuit is re-started after a predetermined period from a protection operation is activated. The latch mode is a protection mode where the protection operation is activated and maintained. In the latch mode, the protection mode may be released by a reset operation whereby the input voltage Vin of the power supply device 1 is blocked and then supplied again.

The switch control circuit 10 may be initialized when the multi-voltage VM reaches a predetermined initialization voltage to set the first dead time and the second dead time during a predetermined initialization period. Further, the switch control circuit 10 may set the protection mode according to a level of the multi-voltage VM of a steady state after the initialization period has ended. Hereinafter, the switch control circuit according to the embodiment will be described in detail with reference to FIG. 2.

Figure 2:
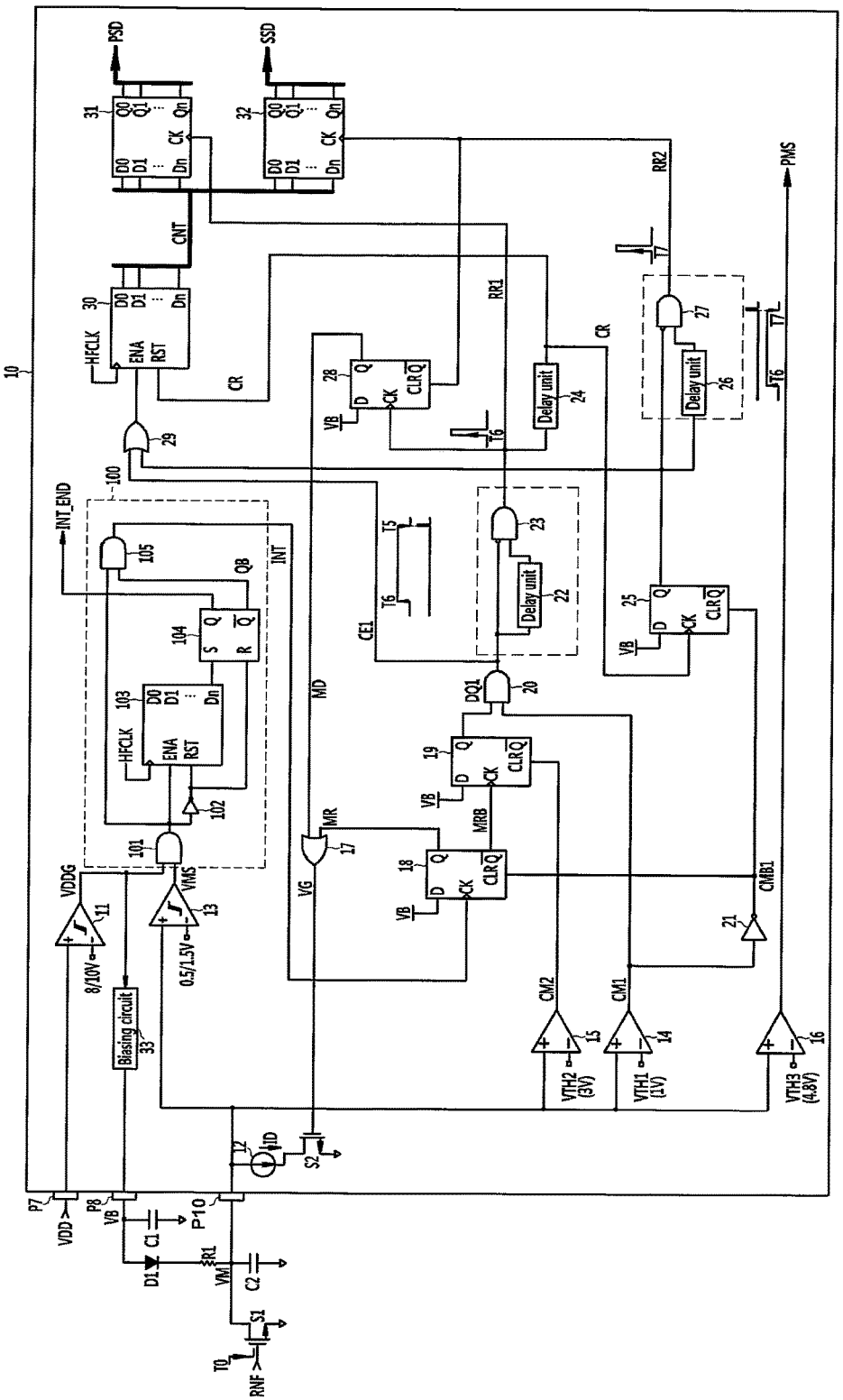
FIG. 2 is a view showing a portion of a switch control circuit according to the embodiment.

FIG. 2 is a view showing a portion of the switch control circuit according to the embodiment.

Figure 3:
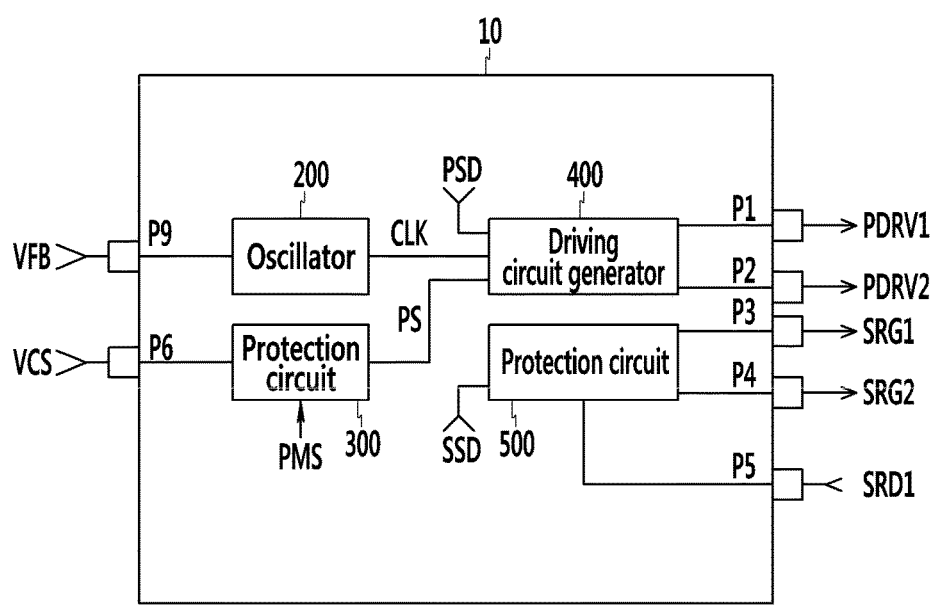
FIG. 3 is a view showing another portion of the switch control circuit according to the embodiment.

FIG. 3 is a view showing another portion of the switch control circuit according to the embodiment.

FIG. 2 shows only constitutions describing the embodiment among constitutions of the switch control circuit 10, but the embodiment is not limited thereto.

A comparator 11 generates a signal VDDG according to a comparison result of the source voltage VDD and reference voltages (8/10 V). According to a hysteresis characteristic of the comparator 11, the comparator 11 outputs the signal VDDG at a high level when the source voltage VDD starts to be increased and reaches 10 V or more. After the source voltage VDD is 10 V or more, when the source voltage VDD is 8 V or more, the high level is maintained. When the source voltage VDD is a voltage of less than 8 V, the comparator 11 outputs the signal VDDG at a low level to show an under-voltage state. The reference voltages of 8 V and 10 V are values set to describe the embodiment, but the embodiment is not limited thereto.

A biasing circuit 33 generates the bias voltage VB when the source voltage VDD is in a steady state. For example, the biasing circuit 33 may be activated by the signal VDDG at the high level to generate the bias voltage VB by using the source voltage VDD. A current charging the capacitor C2 may be supplied when the bias voltage VB is supplied in a predetermined voltage (e.g., 5 V).

A comparator 13 generates a signal VMS according to a comparison result of the multi-voltage VM and reference voltages (0.5/1.5 V). According to a hysteresis characteristic of the comparator 13, the comparator 13 outputs the signal VMS at a high level when the multi-voltage VM starts to be increased and reaches 1.5 V or more. After the multi-voltage VM is 1.5 V or more, when the multi-voltage VM is 0.5 V or more, the high level is maintained. When the multi-voltage VM is a voltage of less than 0.5 V, the comparator 13 outputs the signal VMS at a low level. The reference voltages of 0.5 V and 1.5 V are values set to describe the embodiment, but the embodiment is not limited thereto.

An initialization unit 100 counters the initialization period by using a count clock signal HFCLK from a time at which the multi-voltage VM reaches the initialization voltage, and enables an initialization signal INT controlling setting of the first dead time and setting of the second dead time during the initialization period. After the initialization period is ended, the initialization unit 100 enables an initialization end signal INIT_END and disables the initialization signal INIT.

The initialization unit 100 starts to count the initialization period when the multi-voltage VM reaches a predetermined reference voltage while the source voltage VDD is in the steady state, not the under-voltage state. When the source voltage VDD is in the under-voltage state, counting of the initialization period does not start. Further, the initialization unit 100 maintains a counting operation of the initialization period when the source voltage VDD is in the steady state. When the source voltage VDD is the under-voltage state during counting, a counting result is reset regardless of the multi-voltage VM.

The initialization unit 100 includes two AND gates 101 and 105, an inverter 102, a first counter 103, and an SR latch 104.

The AND gate 101 performs a logical AND operation of the signal VDDG and the signal VMS to determine an output. When both two input signals are at a high level, the output of the AND gate 101 has a high level. When a high level as an enable level is inputted to an enable end ENA of the first counter 103, the first counter 103 starts a counting operation by using the count clock signal HFCLK.

The inverter 102 is connected to an output end of the AND gate 101, inverts the output of the AND gate 101, and outputs the inverted output. When a high level is inputted to a reset end RST of the first counter 103, the first counter 103 resets a counting result. For example, when at least one of the signal VDDG and the signal VMS is at a low level, the counting result of the operated first counter 103 is reset.

The first counter 103 includes a plurality of output ends D0-Dn. Levels of a plurality of output ends D0-Dn are determined according to the counting result of the first counter 103. The output of an appropriate output end among a plurality of output ends D0-Dn may be selected according to the initialization period. FIG. 1 shows that the output of an n-th output end Dn corresponds to the initialization period, but the embodiment is not limited thereto.

The SR latch 104 enables the initialization end signal INTEND according to the output of the first counter 103 and outputs an inverted output signal QB for disabling the initialization signal INT. A set end S of the SR latch 104 is connected to the output of the first counter 103, and a reset end of the SR latch 104 is connected to an output of the inverter 102. The initialization end signal INT_END is outputted through an output end Q of the SR latch 104, and the inverted output signal QB is outputted through an inverted output end $\overline{Q}$.

Since the output of the inverter 102 is a high level before the multi-voltage VM is increased, the inverted output signal QB is a high level and the initialization end signal INT_END is a low level. When the output of the inverter 102 is a low level due to an increase of the multi-voltage VM, outputs of the output end Q and the inverted output end $\overline{Q}$ are determined according to the input of the set end S. For example, when the output of the output end Dn of the first counter 103 is a high level, the initialization end signal INT_END is a high level and the inverted output signal QB is a low level.

The AND gate 105 performs a logical AND operation of the output of the AND gate 101 and the inverted output signal QB to generate the initialization signal INT. When both two inputs are a high level, the AND gate 101 generates the initialization signal INT of the enable level.

A sink current source 12 may be connected to the pin P10 to control a decreasing slope of the multi-voltage VM. A switch S2 is connected between the sink current source 12 and the secondary side ground. When the switch S2 is turned-on by an output of an OR gate 17, the multi-voltage VM is decreased by a current ID of the sink current source 12. The decreasing slope of the multi-voltage VM may be adjusted according to a level of the current ID.

A comparator 14 generates a first comparison signal CM1 according to a comparison result of the multi-voltage VM and the first threshold voltage VTH1. A comparator 15 generates a second comparison signal CM2 according to a comparison result of the multi-voltage VM and the second threshold voltage VTH2. A comparator 16 generates a protection mode signal PMS setting the protection mode according to a comparison result of the multi-voltage VM and a third threshold voltage VTH3.

The multi-voltage VM is inputted to a non-inverting terminal (+) of each of the comparator 14, the comparator 15, and the comparator 16. The first to third threshold voltages VTH1-VTH3 are inputted to inverting terminals (−) of the comparator 14, the comparator 15, and the comparator 16, respectively.

FIG. 2 shows that the first threshold voltage VTH1 is 1 V, the second threshold voltage VTH2 is 3 V, and the third threshold voltage VTH3 is 4.8 V, but is just an example for description, but the embodiment is not limited thereto. Moreover, in the embodiment, the bias voltage VB is set to 5 V.

An inverter 21 inverts the first comparison signal CM1 to generate an inverted comparison signal CMB1.

D-flip-flops 18, 19, 25, and 28 include a clock terminal CK, and are synchronized with a rising edge of an input of the clock terminal to output an input of an input end D.

The bias voltage VB is inputted to the input end D of the D-flip-flop 18. The D-flip-flop 18 outputs an output signal MR of a high level according to a high level of the input end D through the output end Q and outputs an inverted output signal MRB of a low level through the inverted output end $\overline{Q}$ in synchronization with a rising edge of the initialization signal INT. The inverted comparison signal CMB1 is inputted to a clear end CLR of the D-flip-flop 18. The D-flip-flop 18 resets the output signal MR at a low level and generates the inverted output signal MRB of a high level according to the inverted comparison signal CMB1 of the high level as the enable level.

The bias voltage VB is inputted to the input end D of the D-flip-flop 19. The D-flip-flop 19 outputs an output signal DQ1 of a high level through the output end Q in synchronization with a rising edge of the inverted output signal MRB of the D-flip-flop 18. The second comparison signal CM2 is inputted to a clear end CLR of the D-flip-flop 19. The D-flip-flop 19 resets the output signal DQ1 at a low level according to the second comparison signal CM2 of a high level as the enable level.

An AND gate 20 performs a logical AND operation of the output signal DQ1 of the D-flip-flop 19 and the first comparison signal CM1 to generate a first count enable signal CE1. When both two inputs have a high level, the AND gate 20 generates the first count enable signal CE1 of a high level.

A delay unit 22 and a logic gate 23 constitute a pulse generator. The delay unit 22 delays the first count enable signal CE1 by a predetermined period and outputs the first count enable signal CE1. An input end of the logic gate 23 is an inverting input end, and the input end of the logic gate 23 to which the first count enable signal CE1 is inputted is the inverting input end. The logic gate 23 performs a logical AND operation of an inverted first count enable signal CE1 and the output of the delay unit 22 to generate a first register read signal RR1. For example, the logic gate 23 is synchronized with a falling edge of the inverted first count enable signal CE1 to generate the first register read signal RR1 as a short pulse having a high level during a delay period.

A delay unit 24 delays the first register read signal RR1 by a predetermined period and outputs a count reset signal CR.

The bias voltage VB is inputted to an input end D of a D-flip-flop 25. D-flip-flop 25 outputs a second count enable signal CE2 of a high level through the output end Q in synchronization with a rising edge of the delayed first register read signal RR1.

The inverted comparison signal CMB1 is inputted to a clear end CLR of the D-flip-flop 25. The D-flip-flop 25 resets the second count enable signal CE2 at a low level according to the inverted comparison signal CMB1 of a high level as the enable level.

A delay unit 26 and a logic gate 27 constitute a pulse generator. The delay unit 26 delays the second count enable signal CE2 by a predetermined period and outputs the second count enable signal CE2. An input end of the logic gate 27 is an inverting input end, and the input end of the logic gate 27 to which the second count enable signal CE2 is inputted is the inverting input end. The logic gate 27 performs a logical AND operation of an inverted second count enable signal CE2 and the output of the delay unit 26 to generate a second register read signal RR2. For example, the logic gate 27 is synchronized with a falling edge of the inverted second count enable signal CE2 to generate the second register read signal RR2 as a short pulse having a high level by a delay period.

An OR gate 29 outputs a logical OR operation result of the first and second count enable signals CE1 and CE2. For example, when at least one of the first and second count enable signals CE1 and CE2 is a high level, the output of the OR gate 29 has a high level.

When a high level as the enable level is inputted to an enable end ENA of a second counter 30, the second counter 30 starts a counting operation by using the count clock signal HFCLK. When a high level is inputted to a reset end RST of the second counter 30, the second counter 30 resets a counting result. For example, when a count reset signal CR has a high level, the counting result of the second counter 30 is reset.

The second counter 30 includes a plurality of output ends D0-Dn. The levels of a plurality of output ends D0-Dn are determined according to the counting result of the second counter 30. A count signal CNT is generated by a combination of the levels of a plurality of output ends D0-Dn. A plurality of output ends D0-Dn are connected to a plurality of input ends of a first register 31 and a second register 32. For convenience of description, a plurality of input ends of the first and second registers 31 and 32 are designated by the same reference numerals as a plurality of output ends of the second counter 30.

The first register 31 stores the first dead time between the first switch Q1 and the second switch Q2 of the primary side. The first register 31 includes a clock end CK, and is synchronized with a rising edge of the clock end CK to store the count signal CNT inputted to a plurality of input ends D0-Dn. The first register read signal RR1 is inputted to the clock end CK of the first register 31. The first register 31 outputs first dead time information PSD through a plurality of output ends Q0-Qn.

The second register 32 stores the second dead time between the first synchronous rectification switch SR1 and the second synchronous rectification switch SR2 of the secondary side. The second register 32 includes the clock end CK, and is synchronized with the rising edge of the clock end CK to store the count signal CNT inputted to a plurality of input ends D0-Dn. The second register read signal RR2 is inputted to the clock end CK of the second register 32. The second register 32 outputs second dead time information SSD through a plurality of output ends Q0-Qn.

The bias voltage VB is inputted to an input end D of a D-flip-flop 28. The D-flip-flop 28 outputs a multi-discharge signal MD of a high level through the output end Q in synchronization with a rising edge of the first register read signal RR1. The second register read signal RR2 is inputted to a clear end CLR of the D-flip-flop 28. The D-flip-flop 28 resets the multi-discharge signal MD at a low level according to the second register read signal RR2 of a high level as the enable level.

The OR gate 17 receives the multi-discharge signal MD and the output signal MR of the D-flip-flop 18 and performs a logical OR operation to generate a gate voltage VG. When at least one of two inputs is a high level, the OR gate 17 generates the gate voltage VG of a high level. When the switch S2 is turned-on by the gate voltage VG of a high level, the multi-voltage VM is reduced by discharging.

FIG. 2 shows that the bias voltage VB is inputted to the input ends D of the D-flip-flops 18, 19, 25, and 28, but the voltage of the input end D is not limited to the bias voltage VB and may be another voltage of a high level.

Referring to FIG. 3, the switch control circuit 10 further includes an oscillator 200, a protection circuit 300, a driving signal generation unit 400, and a synchronous rectification controller 500.

The oscillator 200 receives the feedback voltage VFB, and generates a clock signal CLK determining the switching frequency according to the feedback voltage VFB. For example, the frequency of the clock signal CLK is increased to increase the switching frequency according to an increase in feedback voltage VFB. On the contrary, the frequency of the clock signal CLK is decreased to reduce the switching frequency according to a decrease in feedback voltage VFB.

The protection circuit 300 sets the protection mode based on the protection mode signal PMS, and senses the sensing voltage VCS to control a protection operation. For example, the protection circuit 300 may generate a protection signal PS of the enable level when the overcurrent is sensed.

The driving signal generation unit 400 receives the clock signal CLK, first dead time information PSD, and the protection signal PS, and generates the first driving voltage PDRV1 and the second driving voltage PDRV2 based on the clock signal CLK and first dead time information PSD. The driving signal generation unit 400 may not generate the first driving voltage PDRV1 and the second driving voltage PDRV2 according to the protection signal PS of the enable level.

For example, the driving signal generation unit 400 increases the first driving voltage PDRV1 at a high level at a time delayed from a rising edge of the clock signal CLK by the first dead time according to first dead time information PSD and decreases the second driving voltage PDRV2 at a low level at the rising edge of the clock signal CLK. The driving signal generation unit 400 increases the second driving voltage PDRV2 at a high level at the time delayed from a falling edge of the clock signal CLK by the first dead time according to first dead time information PSD and decreases the first driving voltage PDRV1 at a low level at the falling edge of the clock signal CLK.

The synchronous rectification controller 500 receives the voltage SRD1 corresponding to both end voltages of the first synchronous rectification switch SR1 senses the conduction time of the body diode BD3 by using the voltage SRD1, and is synchronized with the conduction time to generate a gate voltage SRG1 of a high level turning-on the first synchronous rectification switch SR1.

The synchronous rectification controller 500 maintains the gate voltage SRG1 at a high level during the turn-on period set based on the conduction period of the body diode BD3 counted by using the voltage SRD1 during the prior switching cycle, and counts the conduction period of the body diode BD3 during the current switching cycle by using the voltage SRD1.

Further, the synchronous rectification controller 500 estimates both end voltages of the second synchronous rectification switch SR2 by using the voltage SRD1. The synchronous rectification controller 500 may flip the voltage SRD1 based on a zero voltage and then perform level shifting to estimate both end voltages of the second synchronous rectification switch SR2.

The synchronous rectification controller 500 determines a turn-on time of the second synchronous rectification switch SR2 by using both end voltages of the estimated second synchronous rectification switch SR2, and generates the gate voltage SRG2 of a high level.

The synchronous rectification controller 500 counts the conduction period of the body diode BD4 by using the estimated both end voltages of the second synchronous current switch SR2 during the prior switching cycle. The synchronous rectification controller 500 maintains the gate voltage SRG2 at a high level during a turn-on period set based on the counted period. Further, the synchronous rectification controller 500 counts the conduction period of the body diode BD4 by estimating the both end voltages of the second synchronous rectification switch SR2 during the current switching cycle.

Hereinafter, an operation of the switch control circuit according to the embodiment will be described with reference to FIG. 4.

Specifically, setting of the first dead time, the second dead time, and the protection mode will be described with reference to FIG. 4.

Figure 4:
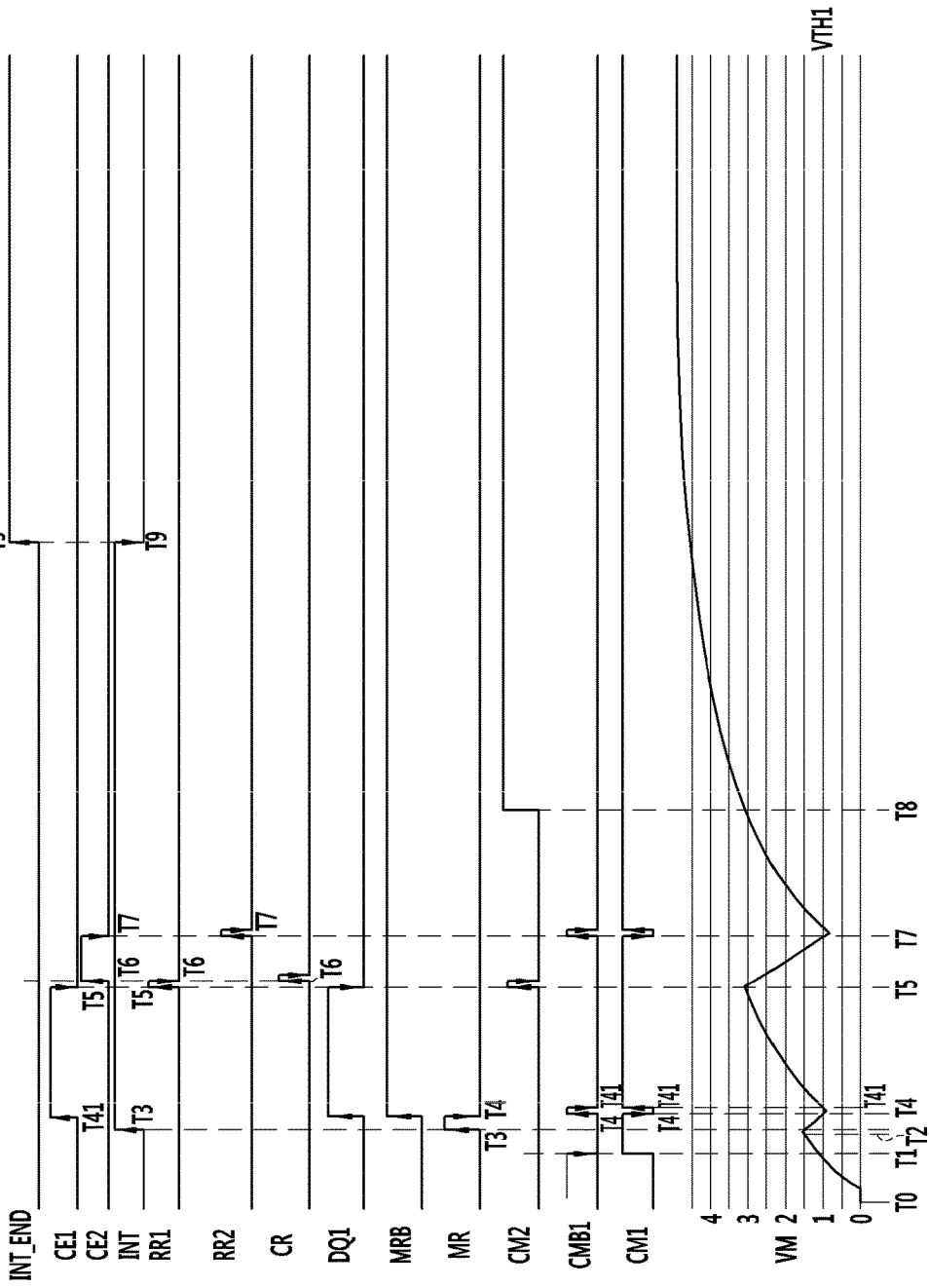
FIG. 4 is a waveform diagram showing waveforms of signals according to the embodiment.

FIG. 4 is a waveform diagram showing waveforms of signals according to the embodiment.

Hereinafter, it is assumed that the signal VDDG has a high level in the description of the operation with reference to FIG. 4. The remote control signal RNF has a low level at a time of T0, and thus the switch S1 is turned-off and the capacitor C2 starts to be charged. Then, the multi-voltage VM starts to be increased from the time of T0.

When the multi-voltage VM reaches the first threshold voltage VTH1 at a time of T1, the first comparison signal CM1 is a high level and the inverted comparison signal CMB1 is a low level.

When the multi-voltage VM reaches the reference voltage of 1.5 V at a time of T2, the signal VMS is a high level, and thus the output of the AND gate 101 is a high level. Then, the initialization signal INT as the output of the AND gate 105 is a high level at a time of T3, and the first counter 103 is enabled, and thus the counting operation starts. The D-flip-flop 18 is enabled by the initialization signal INT of a high level at the time of T3, and thus the output signal MR is a high level. The gate voltage VG as the output of the OR gate 17 is a high level, and thus the switch S2 is turned-on. Then, the capacitor C2 is discharged by the current ID of the sink current source 12, and thus the multi-voltage VM starts to be decreased from the time of T3.

When the multi-voltage VM is a voltage that is smaller than the first threshold voltage of 1 V at a time of T4, the first comparison signal CM1 is a low level and the inverted comparison signal CMB1 is a high level. The D-flip-flop 18 is reset at the time of T4, and thus the output signal MR is a low level and the inverted output signal MRB is a high level. Then, the gate voltage VG is a low level, and the D-flip-flop 19 is enabled, and thus the output signal DQ1 is a high level. The switch S2 is turned-off by the gate voltage VG of a low level and the multi-voltage VM starts to be increased.

When the multi-voltage VM reaches the first threshold voltage VTH1 at a time of T41, the first comparison signal CM1 is a high level and the inverted comparison signal CMB1 is a low level. Then, all inputs of the AND comparator 20 are a high level, and thus the first count enable signal CE1 is a high level.

When the multi-voltage VM reaches the second threshold voltage VTH2 at a time of T5, the second comparison signal CM2 is a high level and the D-flip-flop 19 is reset, and thus the output signal DQ1 is a low level. Then, the first count enable signal CE1 is a low level. An AND gate 23 performs a logical AND operation of an inverted first count enable signal CE1 and a signal obtained by delaying the first count enable signal CE1 to generate the first register read signal RR1 of a high level at the time of T5. Since the signal obtained by delaying the first count enable signal CE1 is decreased to a low level after the delay period of the delay unit 22, the AND gate 23 generates the first register read signal RR1 of a low level after the delay period. The delay period according to the embodiment may be set so as to generate the first register read signal RR1 as a short pulse.

The counter 31 stores the count signal CNT inputted through a plurality of input ends D0-Dn according to the first register read signal RR1, and outputs first dead time information PSD through a plurality of output ends Q0-Qn.

The delay unit 24 delays the first register read signal RR1 by the delay period, and outputs a count reset CR as a high level pulse at a time of T6. The second counter 30 rests the count signal CNT according to the count reset CR at the time of T6.

The D-flip-flop 25 is enabled by the count reset CR at the time of T6 to output the second count enable signal CE2 of a high level. The OR gate 29 outputs a high level according to the second count enable signal CE2 at the time of T6, and the count 30 is enabled by the output of the OR gate 29 to start a counting operation.

Meanwhile, the D-flip-flop 28 is enabled by the first register read signal RR1 at the time of T5, and outputs the multi-discharge signal MD at a high level at the time of T5. The OR gate 17 outputs the gate voltage VG of a high level according to the multi-discharge signal MD of a high level, and the switch S2 is turned-on. Then, the capacitor C2 is discharged by the current ID of the sink current source 12, and thus the multi-voltage VM starts to be decreased from the time of T5. Since the multi-voltage VM starts to be decreased from the time of T5, the second comparison signal CM2 has a pulse waveform where a pulse is increased to a high level at the time of T5 and then reduced to a low level.

When the multi-voltage VM is smaller than the first threshold voltage VTH1 at a time of T7, the inverted comparison signal CMB1 is increased to a high level. The D-flip-flop 25 is reset by the inverted comparison signal CMB1. The second count enable signal CE2 is decreased to a low level at the time of T7.

An AND gate 27 performs a logical AND operation of an inverted second count enable signal CE2 and a signal obtained by delaying the second count enable signal CE2 to generate the second register read signal RR2 of a high level at the time of T7. Since the signal obtained by delaying the second count enable signal CE2 is reduced to a low level after the delay period of the delay unit 26, the AND gate 27 generates the second register read signal RR2 of a low level after the delay period. The delay period according to the embodiment may be set so as to generate the second register read signal RR2 as the short pulse.

The counter 32 stores the count signal CNT inputted through a plurality of input ends D0-Dn by the second register read signal RR2, and outputs second dead time information SSD through a plurality of output ends Q0-Qn.

Meanwhile, the D-flip-flop 28 is reset by the second register read signal RR2 at the time of T7, and outputs the multi-discharge signal MD at a low level at the time of T7. Since both two inputs of the OR gate 17 have a low level, the OR gate 17 outputs the gate voltage VG of a low level, and the switch S2 is turned-off. Then, the capacitor C2 is charged by the current supplied by the bias voltage VB after the time of T7, and thus the multi-voltage VM starts to be increased. Since the multi-voltage VM starts to be increased from the time of T7, the first comparison signal CM1 has a pulse waveform where a pulse is decreased to a low level at the time of T7 and then increased to a high level. On the contrary, the inverted comparison signal CMB1 has a pulse waveform where a pulse is increased to a high level at the time of T7 and then decreased to a low level.

The output of the output end Dn of the first counter 103 is increased to a high level at a time of T9. The corresponding output end of a plurality of output ends D0-Dn may be determined according to the initialization period. The SR latch 104 generates the initialization end signal INTEND of a high level and the inverted output signal QB of a low level according to the output of the output end Dn. The AND gate 105 generates the initialization signal INT of a low level according to the inverted output signal QB of a low level. As shown in FIG. 4, the initialization signal INT is maintained at a high level during the initialization period.

After the initialization period, the multi-voltage VM is maintained at a steady state level. In the embodiment, the diode D1 is connected between the bias voltage VB and the capacitor C2, and thus the steady state level of the multi-voltage VM increased by charging of the capacitor C2 is limited.

For example, when the bias voltage VB is 5 V and a forward voltage of the diode D1 is 0.3 V, the steady state level is limited to 4.7 V. The third threshold voltage VTH3 is set to 4.8 V, and thus the protection mode signal PMS as the output of the comparator 16 has a low level.

Unlike this, when the diode D1 is not connected between the bias voltage VB and the capacitor C2, the steady state level may be a level that is higher than the third threshold voltage VTH3, for example, 5 V. Then, the protection mode signal PMS as the output of the comparator 16 is increased to a high level in a steady state of the multi-voltage VM.

As described above, the diode may or may not be connected to the outside of the control circuit according to a protection mode required by a user. For example, when the protection mode signal PMS has a high level, the mode may be an auto-restart mode. When the protection mode signal PMS has a low level, the mode may be a latch mode.

The first dead time information, the second dead time information, the protection modes, and the remote controlling can be obtained through the pin generated by the multi-voltage without any additional pins of an integrated circuit of the switch control circuit according to the embodiment. The number of pins of the IC and the size of the IC may be reduced through the embodiment.

The period during which the multi-voltage is increased from the first threshold voltage to the second threshold voltage may be adjusted through a time constant based on the resistor R1 and the capacitor C2. That is, first dead time information may be adjusted through the resistor R1 and the capacitor C2.

Further, the period during which the multi-voltage is decreased from the second threshold voltage to the first threshold voltage may be adjusted through a current of the sink current source 12 together with the time constant based on the resistor R1 and the capacitor C2. That is, second dead time information may be adjusted through the resistor R1, the capacitor C2, and the sink current source 12.

Moreover, the steady state level of the multi-voltage may be adjusted according to whether the diode is connected between the bias voltage VB and the capacitor C2. That is, the protection mode may be set according to whether the diode is connected.

In addition, generation and removal of the multi-voltage may be adjusted by an on/off of the switch S1. That is, remote controlling may be adjusted by the switch S1.

While this embodiments have been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: power supply device
Q1: first switch
Q2: second switch
20: transformer
30: gate driving circuit
SR1: first synchronous rectification switch
SR2: second synchronous rectification switch
10: switch control circuit
11, 13, 14, 15, 16: comparator
12: sink current source
17, 29: OR gate
18, 19, 25, 28: D-flip-flop
20, 23, 27, 101, 105: AND gate
22, 24, 26: delay unit
30: second counter
103: first counter
31: first register
32: second register
33: biasing circuit
100: initialization unit
21, 102: inverter
200: oscillator
300: protection circuit
400: driving signal generation unit
500: synchronous rectification controller
R1-R11: resistor
C1-C4, Cr: capacitor
Lr: inductor
D: diode
S1, S2: switch

What is claimed:

1. A switch control circuit comprising:
    biasing circuitry configured to generate a predetermined bias voltage at a first pin;
    multi-voltage circuitry configured to sense a multi-voltage at a second pin;
    a first resistor configured to be connected between the first and second pins;
    a first capacitor configured to be connected to the second pin and to generate the multi-voltage based on a current generated through the first resistor by the bias voltage; and
    remote control circuitry to control the multi-voltage, the remote control circuitry comprising a switch to receive a remote control signal to cause the first capacitor to discharge the multi-voltage to ground,
    wherein the multi-voltage circuitry is configured to set, based on the multi-voltage, at least two selected from the group consisting of first dead time information, second dead time information, and a protection mode, and
    wherein the switch control circuit initializes when the remote control signal is at a low level and the switch is turned off.

2. The switch control circuit of claim 1, wherein the multi-voltage circuitry is configured to set at least two selected from the group consisting of the first dead time information, the second dead time information and the protection mode based on counting at least one period in which the multi-voltage varies with respect to at least one threshold voltage.

3. The switch control circuit of claim 2, wherein the multi-voltage circuitry is configured to:
    count a first period from when the multi-voltage increases from a first threshold voltage to a second threshold voltage; and
    set the first dead time based on the first counted period.

4. The switch control circuit of claim 2, wherein the multi-voltage circuitry is configured to:
    count a second period from when the multi-voltage decreases from a second threshold voltage to a first threshold voltage; and
    set the second dead time based on the second counted period.

5. The switch control circuit of claim 2, wherein the multi-voltage circuitry is configured to set the protection mode according to a steady-state level of the multi-voltage.

6. The switch control circuit of claim 5, wherein in setting the protection mode the multi-voltage circuitry is to set the protection mode to an auto-restart mode or a latch mode.

7. A method, comprising:
    initializing a switch control circuit of a power supply;
    providing a bias voltage to a first resistor;
    charging, through the first resistor, a capacitor in the switch control circuit to generate a multi-voltage;
    discharging, using a switch controlled by a remote control signal, the capacitor to ground;
    counting at least one period in which the multi-voltage varies with respect to at least one threshold voltage; and
    setting, based on the count of the at least one period, at least two selected from the group consisting of first dead time information, second dead time information and a protection mode of the power supply,
    wherein the switch control circuit initializes when the remote control signal is at a low level and the switch is turned off.

8. The method of claim 7, wherein counting at least one period comprises counting a first period from when the multi-voltage increases from a first threshold voltage to a second threshold voltage; and setting at least two of first dead time information, second dead time information and a protection mode comprises setting the first dead time based on the first counted period.

9. The method of claim 7, wherein counting at least one period comprises counting a second period from when the multi-voltage decreases from a second threshold voltage to a first threshold voltage; and setting at least two of first dead time information, second dead time information and a protection mode comprises setting the second dead time based on the second counted period.

10. The method of claim 7, wherein setting at least two of first dead time information, second dead time information and a protection mode comprises setting the protection mode according to a steady-state level of the multi-voltage.

11. A power supply device, comprising:
a first switch and a second switch coupled in series between an input voltage and a primary side ground;
a transformer including:
a primary side wire coupled to the input voltage and a node between the first switch and the second switch; and
at least one secondary side wire;
a first synchronous rectification switch to rectify a current flowing through a first wire of a secondary side;
a second synchronous rectification switch to rectify a current flowing through a second wire of the secondary side; and
a switch control circuit including:
biasing circuitry configured to generate a predetermined bias voltage at a first pin;
multi-voltage circuitry configured to sense a multi-voltage at a second pin;
a first resistor configured to be connected between the first and second pins;
a first capacitor configured to be connected to the second pin and to generate the multi-voltage based on a current generated through the first resistor by the bias voltage;
wherein the multi-voltage circuitry is configured to set at least two of a dead time between switching of the first and second switches, a dead time between switching of the first and second synchronous rectification switches, and a protection mode based on the multi-voltage,
wherein the multi-voltage circuitry is configured to set the protection mode according to a steady-state level of the multi-voltage, and
wherein in setting the protection mode the multi-voltage circuitry includes setting the protection mode to an auto-restart mode or a latch mode.

12. The power supply device of claim 11, wherein the multi-voltage circuitry is configured to set at least two of the dead time between switching of the first and second switches, the dead time between switching of the first and second synchronous rectification switches, and the protection mode based on counting at least one period in which the multi-voltage varies with respect to at least one threshold voltage.

13. The power supply device of claim 11, wherein the multi-voltage circuitry is configured to:
count a first period from when the multi-voltage increases from a first threshold voltage to a second threshold voltage; and
set the dead time between switching of the first and second switches based on the first counted period.

14. The power supply device of claim 11, wherein the multi-voltage circuitry is configured to:
count a second period from when the multi-voltage decreases from a second threshold voltage to a first threshold voltage; and
set the dead time between switching of the first and second switches based on the second counted period.

* * * * *